(12) United States Patent
Liu

(10) Patent No.: US 11,904,475 B2
(45) Date of Patent: Feb. 20, 2024

(54) ROBOT AND OPERATING SYSTEM, CONTROL DEVICE, CONTROL METHOD AND STORAGE MEDIUM THEREOF

(71) Applicant: Beijing Magic Pal Technology Co., Ltd., Beijing (CN)

(72) Inventor: Peng Liu, Beijing (CN)

(73) Assignee: BEIJING MAGIC PAL TECHNOLOGY CO., LTD., Beijing (CN)

( * ) Notice: Subject to any disclaimer, the term of this patent is extended or adjusted under 35 U.S.C. 154(b) by 1147 days.

(21) Appl. No.: 16/609,752

(22) PCT Filed: Mar. 6, 2019

(86) PCT No.: PCT/CN2019/077218
§ 371 (c)(1),
(2) Date: Oct. 31, 2019

(87) PCT Pub. No.: WO2020/151053
PCT Pub. Date: Jul. 30, 2020

(65) Prior Publication Data
US 2021/0276186 A1 Sep. 9, 2021

(30) Foreign Application Priority Data

Jan. 25, 2019 (CN) .......................... 201910074756.3

(51) Int. Cl.
*B25J 9/16* (2006.01)
*B25J 13/06* (2006.01)
(Continued)

(52) U.S. Cl.
CPC .............. *B25J 9/1664* (2013.01); *B25J 9/161* (2013.01); *B25J 9/1653* (2013.01); *B25J 9/1697* (2013.01);
(Continued)

(58) Field of Classification Search
CPC ........ B25J 9/1664; B25J 9/161; B25J 9/1653; B25J 9/1697; B25J 13/006; B25J 13/089;
(Continued)

(56) References Cited

U.S. PATENT DOCUMENTS

2015/0100461 A1* 4/2015 Baryakar ........... G06Q 30/0601
 901/1
2018/0304472 A1* 10/2018 Angle .................. G05D 1/0044
(Continued)

FOREIGN PATENT DOCUMENTS

JP 2018161702 A * 10/2018
KR 101097761 B1 * 12/2011
(Continued)

OTHER PUBLICATIONS

Hegel et al., "Understanding Social Robots: A User Study on Anthromorphism," 2008 (Year: 2008).*
(Continued)

*Primary Examiner* — Jonathan L Sample
*Assistant Examiner* — Byron Xavier Kasper
(74) *Attorney, Agent, or Firm* — Bayramoglu Law Offices LLC

(57) ABSTRACT

A robot and an operating system, a control device, a control method and a storage medium thereof, wherein the robot includes a processor configured to execute the following operation commands: controlling the robot to move to a designated position corresponding to an interaction scenario, wherein the interaction scenario is a scenario in which the robot interacts with a user; controlling the robot to perform an operation corresponding to an operation of the user in the interaction scenario, thereby realizing the robot can perform a complex interaction with the user based on the colorful interaction scenario and solving the technical problem of the prior art that the interaction scenario and the interactive content between the user and the robot are excessively monotonous.

21 Claims, 2 Drawing Sheets

(51) Int. Cl.
*B25J 13/00* (2006.01)
*B25J 13/08* (2006.01)
*B25J 11/00* (2006.01)

(52) U.S. Cl.
CPC ........... *B25J 13/006* (2013.01); *B25J 13/089* (2013.01); *B25J 11/0005* (2013.01)

(58) Field of Classification Search
CPC .... B25J 11/0005; B25J 9/1679; B25J 9/1602; B25J 13/06; B25J 9/162; B25J 9/1689; G07F 17/3223; G07F 17/3225; A63F 9/24; A63F 13/00; G05B 2219/40146; G05B 2219/39212
See application file for complete search history.

(56) References Cited

U.S. PATENT DOCUMENTS

| | | | | |
|---|---|---|---|---|
| 2019/0369641 | A1* | 12/2019 | Gillett | G05D 1/0027 |
| 2020/0101614 | A1* | 4/2020 | Thackston | B25J 13/006 |

FOREIGN PATENT DOCUMENTS

| | | | | |
|---|---|---|---|---|
| KR | 101097761 B1 | * | 12/2011 | |
| WO | WO-2016129770 A1 | * | 8/2016 | .............. A47L 9/28 |
| WO | WO-2018090713 A1 | * | 5/2018 | |

OTHER PUBLICATIONS

Hegel et al., "Understanding Social Robots: A User Study of Anthromorphism," 2008 (Year: 2008).*

* cited by examiner

ROBOT AND OPERATING SYSTEM, CONTROL DEVICE, CONTROL METHOD AND STORAGE MEDIUM THEREOF

CROSS REFERENCE TO THE RELATED APPLICATIONS

This application is the national phase entry of International Application No. PCT/CN2019/077218, filed on Mar. 6, 2019, which is based upon and claims priority to Chinese Patent Application No. 201910074756.3, filed on Jan. 25, 2019, the entire contents of which are incorporated herein by reference.

TECHNICAL FIELD

The present disclosure relates to the field of robots. More particularly, the present disclosure relates to a robot and an operating system, a control device, a control method and a storage medium thereof.

BACKGROUND

With the development of artificial intelligence technology, robots with certain intelligent functions have become more and more widespread. Consequently, the emergence of robots has also brought a lot of fun to people. However, there are still a number of limitations to the existing robots. For example, the robots are set as a subordinate position in the prior art, thereby showing an interaction characteristic mainly obedient to the command from action to interaction, while this basic setting limits the robots' active service to humans, and also deprives the possibility of the individualized development of the robots. Currently, the interaction between the robot and the user is still limited to a simple voice interaction, and the robots are not capable of performing a complex communication. Therefore, the interaction scenario and the interactive content between the robot and the user are excessively monotonous, the user will quickly lose interest in the robot. Therefore, people are eager to provide a robot capable of performing a complex interaction with a user in a more colorful scenario.

In view of the foregoing technical problems in the prior art that the interaction scenario and the interactive content between the robot and the user are excessively monotonous and therefore the user will quickly lose interest in the robot, an effective solution to overcome these problems has not yet been provided.

SUMMARY

The embodiments of the present disclosure provide a robot and an operating system, a control device, a control method and a storage medium thereof, in order to at least solve the technical problems that the interaction scenario and the interactive content between the robot and the user are excessively monotonous and therefore the user will quickly lose interest in the robot.

According to one aspect of the embodiments of the present disclosure, a robot is provided, and the robot includes a processor configured to execute the following operation commands: controlling the robot to move to a designated position corresponding to an interaction scenario, wherein the interaction scenario is a scenario in which the robot interacts with a user; controlling the robot to perform an operation corresponding to an operation of the user in the interaction scenario.

According to another aspect of the embodiments of the present disclosure, a mobile terminal is provided, and the mobile terminal includes a processor configured to execute the following operation commands: sending scenario information to the robot, wherein the scenario information is used to instruct an interaction scenario in which the robot interacts with the user; determining a control command, wherein the control command is used to control the robot to perform an operation corresponding to an operation input by the user in the interaction scenario; and sending the control command to the robot.

According to another aspect of the embodiments of the present disclosure, a control device is provided, and the control device includes a processor configured to execute the following operation commands: sending scenario information to a robot, wherein the scenario information is used to instruct an interaction scenario in which the robot interacts with a user; determining a control command, wherein the control command is used to control the robot to perform an operation corresponding to an operation input by the user in the interaction scenario; and sending the control command to the robot.

According to another aspect of the embodiments of the present disclosure, a robot operating system is provided, including: a control device, a robot, and a mobile terminal, wherein the control device is configured to send an operation command of a user to the robot, and the mobile terminal is used to control the robot, the robot is configured with a processor, and the processor is used to execute the following operation commands: receiving scenario information sent by the mobile terminal, wherein the scenario information is used to instruct an interaction scenario in which the robot interacts with the user; controlling the robot to move to a designated position corresponding to the interaction scenario according to the scenario information; receiving a control command related to the interaction scenario sent by the mobile terminal, wherein the control command is used to instruct the robot to perform an operation corresponding to an operation of the user in the interaction scenario; and controlling the robot to perform an operation related to the control command in the interaction scenario; and the mobile terminal includes a processor, and the processor is configured to execute the following operation commands: sending the scenario information to the robot, wherein the scenario information is used to instruct the interaction scenario in which the robot interacts with the user; determining the control command, wherein the control command is used to control the robot to perform the operation corresponding to the operation input by the user in the interaction scenario; and sending the control command to the robot.

According to another aspect of the embodiments of the present disclosure, a robot operating system is provided, including: a control device and a robot, wherein the control device includes a processor, and the processor is configured to receive a control operation of a user; the robot is configured with a processor, and the processor is configured to execute the following operation commands: controlling the robot to move to a designated position corresponding to an interaction scenario, wherein the interaction scenario is a scenario in which the robot interacts with the user and is determined according to the control operation of the user; and controlling the robot to perform an operation corresponding to an operation of the user in the interaction scenario.

According to another aspect of the embodiments of the present disclosure, a method for controlling a robot to perform an operation is provided, including controlling the robot to move to a designated position corresponding to an interaction scenario, wherein the interaction scenario is a scenario in which the robot interacts with a user; and controlling the robot to perform an operation corresponding to the operation of the user in the interaction scenario.

According to another aspect of the embodiments of the present disclosure, a method for controlling a robot, including sending scenario information to the robot by a mobile terminal, wherein the scenario information is used to instruct an interaction scenario in which the robot interacts with a user; determining a control command by the mobile terminal, wherein the control command is used to control the robot to perform an operation corresponding to an operation input by the user in the interaction scenario; and sending the control command to the robot by the mobile terminal.

According to another aspect of the embodiments of the present disclosure, a method for controlling a robot, including sending scenario information to the robot by a control device, wherein the scenario information is used to instruct an interaction scenario in which the robot interacts with a user; determining a control command by the control device, wherein the control command is used to control the robot to perform an operation corresponding to an operation input by the user in the interaction scenario; and sending the control command to the robot by the control device.

According to another aspect of the embodiments of the present disclosure, a storage medium is provided, wherein the storage medium includes a stored program, and any one of the above methods is performed by a processor when the program is running.

Therefore, according to the embodiment, the user can input a command to the control device for selecting an interaction scenario, and then the interaction scenario between the user and the robot is determined by the control device according to the command input by the user, and the robot is controlled by the control device to perform a corresponding interaction operation with the user in the interaction scenario. By doing so, the robot can perform a much more variable interaction with the user, and the robot-human interaction process is closer to the real world, thereby solving the technical problems that the interaction scenario and the interactive content between the robot and the user are excessively monotonous and therefore the user will quickly lose interest in the robot.

BRIEF DESCRIPTION OF THE DRAWINGS

The drawings described herein are intended to facilitate a further understanding of the present disclosure, and are a part of the present disclosure. The illustrative embodiments and the descriptions thereof of the present disclosure are intended to illustrate the present disclosure instead of constituting an undue limitation of the present disclosure. In the drawings.

DETAILED DESCRIPTION OF THE EMBODIMENTS

In order to enable those skilled in the art to preferably understand the technical solutions of the present disclosure, the technical solutions in the embodiments of the present disclosure will be clearly and completely described hereinafter with reference to the drawings of the embodiments of the present disclosure. Obviously, the described embodiments are only a part of the embodiments of the present disclosure instead of all embodiments. Based on the embodiments of the present disclosure, all other embodiments obtained by ordinary persons skilled in the art without creative efforts shall fall within the scope of the present disclosure.

It should be noted that the terminologies "first", "second", and the like in the specification, claims and the above drawings of the present disclosure are used to distinguish the similar objects, which are not necessarily used to describe a specific sequence or a sequential order. It should be understood that the data used in this way may be interchanged in an appropriate situation, so that the embodiments of the present disclosure described herein can be implemented in a sequence other than those illustrated or described herein. In addition, the terminologies "include", "comprise" and any variants thereof are intended to cover a non-exclusive inclusion. For example, a process, method, system, product, or device including a series of steps or units is not necessarily limited to those steps or units explicitly listed, but includes other steps or units not explicitly listed or inherent to such process, method, product, or device.

Embodiment 1

Figure 1:
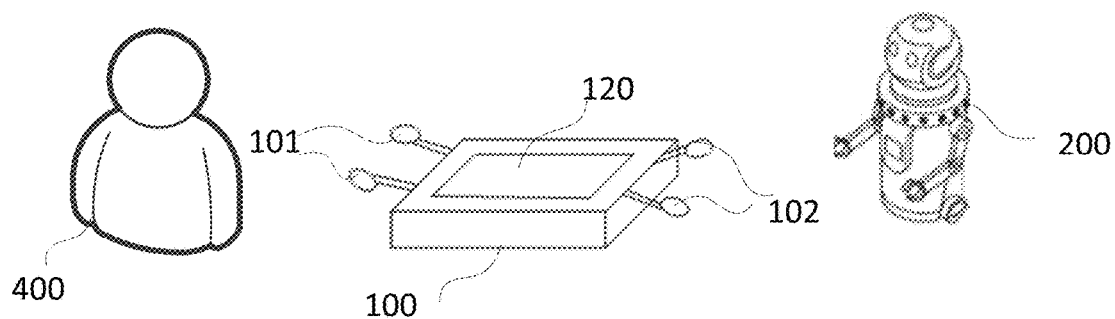
FIG. 1 is a schematic view of a robot operating system according to a first aspect of embodiment 1 of the present disclosure.
Figure 3:
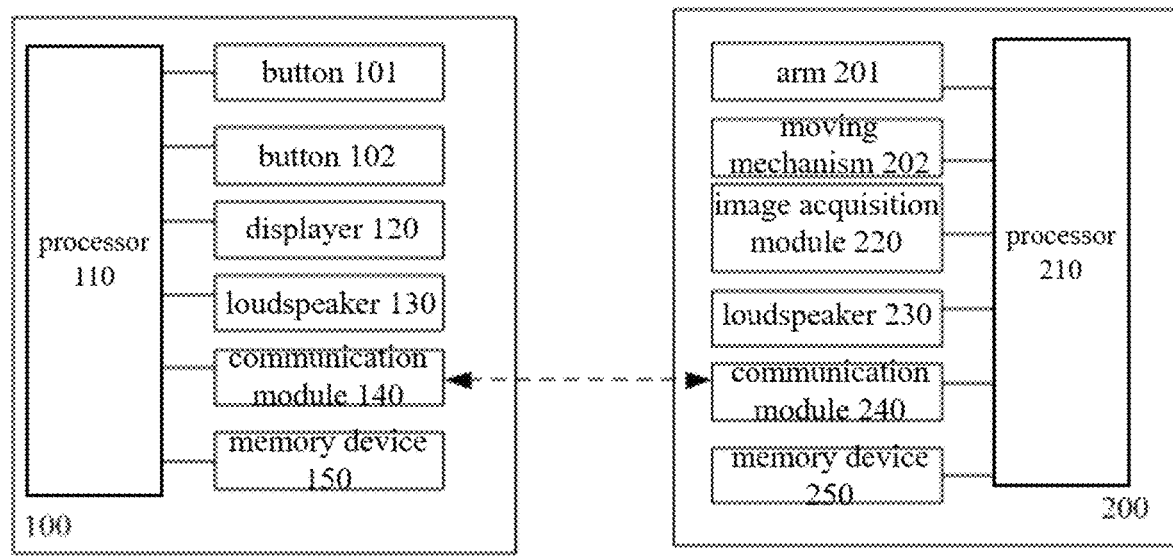
FIG. 3 illustrates block diagrams of the control device 100 and the robot 200 according to embodiment 1 of the present disclosure.

The first aspect of the present embodiment provides a robot operating system. FIG. 1 is a schematic view of the robot operating system according to the first aspect of the present embodiment, and FIG. 3 is block diagrams of the control device 100 and the robot 200 in the operating system. Referring to FIG. 1, the system includes the control device 100 and the robot 200 (e.g. may be a domestic robot), wherein the robot 200 can be controlled by the control device 100.

Referring to FIG. 3, the control device 100 includes the button 101 and the button 102 configured to receive an operation of a user and send a signal corresponding to the operation of the user to the processor 110; the displayer 120 configured to display a frame related to a predetermined interaction scenario; the loudspeaker 130 configured to output an audio signal; the communication module 140 configured to communicate with the communication module 240 of the robot, thereby realizing a communication between the control device 100 and the robot 200; and the memory device 150 configured to store commands executed by the processor 110 and data related to an interaction with the robot 200. The robot 200 includes the arm 201; the moving mechanism 202 configured to implement a movement of the robot 200; the image acquisition module 220; the loudspeaker 230; the communication module 240 configured to communicate with the communication module 140 of the control device 100, thereby realizing the communication between the robot 100 and the control device 200; and the memory device 250 configured to store commands executed by the processor 210 and data during a process of interacting with the control device 100.

Where, although the operation is received by the control device 100 through the button 101 and the button 102 in the embodiment, the operation of the user can be received by other types of input devices. For example, the operation of the user can be received through a touch screen, and also an input from other devices (e.g. a keyboard and a mouse) can be wirelessly received.

Where, the processor 210 in the robot 200 is configured to execute the following operation commands. The scenario information sent by the control device 100 is received, wherein the scenario information is used to instruct an interaction scenario in which the robot 200 interacts with the user; according to the scenario information, the robot 200 is controlled to move to a designated position corresponding to the interaction scenario; a control command sent by the control device 100 and related to the interaction scenario is received, wherein the control command is used to instruct the robot 200 to perform an operation corresponding to an operation of the user in the interaction scenario; and the robot 200 is controlled to perform an operation related to the control command in the interaction scenario.

Further, the processor 110 in the control device 100 is configured to execute the following operation commands: sending the scenario information to the robot 200, wherein the scenario information is used to instruct an interaction scenario in which the robot interacts with the user; determining a control command, wherein the control command is used to control the robot 200 to perform an operation corresponding to an operation input by the user in an interaction scenario; and sending a control command to the robot 200. In this case, the control device 100 will assume the primary computing task. Therefore, the display of the scenario, the control of the process of the entire scenario, and the computation of related interaction data can be completed only by the control device 100. Thereby, the interaction scenario can be realized only by using the control device 100.

Figure 2:
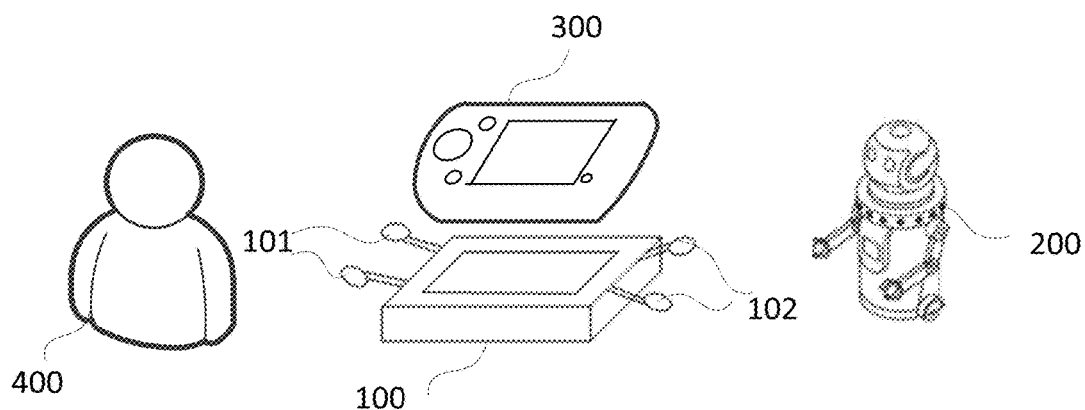
FIG. 2 is a schematic view of a robot operating system according to a second aspect of embodiment 1 of the present disclosure.
Figure 4:
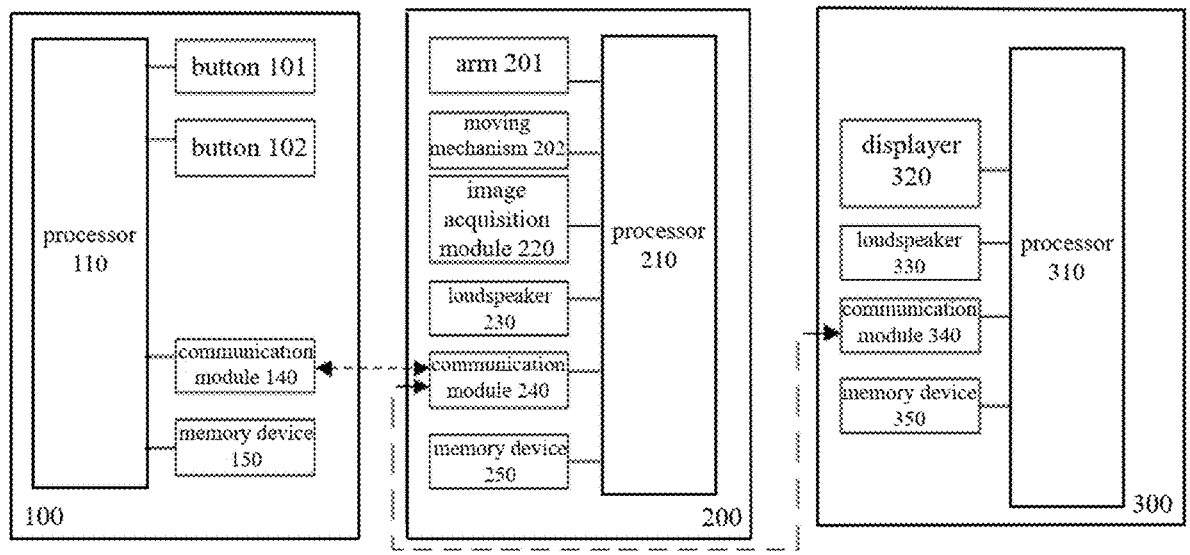
FIG. 4 illustrates block diagrams of the control device 100, the robot 200, and the mobile terminal 300 according to embodiment 1 of the present disclosure.

In a second aspect of the present embodiment, a robot operating system is provided. FIG. 2 is a schematic view of the robot operating system according to the second aspect of the present embodiment, and FIG. 4 shows block diagrams of the control device 100, the robot 200, and the mobile terminal 300 in the operating system. The schematic diagram of the system is different from the system shown in FIG. 1 and in FIG. 3 in that the control device 100 in FIG. 2 and in FIG. 4 is no longer provided with a displayer and a loudspeaker. The user 400 can place his/her own mobile terminal 300 (e.g. an IPAD, a tablet personal computer, a mobile phone, etc.) on the control device 100. The image is displayed, and the audio is played through the displayer and the loudspeaker of the mobile terminal 300.

Further, the system includes: the control device 100, the robot 200 (e.g. a domestic robot) and the mobile terminal 300, wherein the control device 100 serves as a base for the user to interact with the robot and is used to send the operation command input by the user to the robot 200. Then the system can control the robot 200 through the mobile terminal 300.

Referring to FIG. 4, the control device 100 includes: the button 101 and the button 102 configured to receive the operation of the user and send the signal corresponding to the operation of the user to the processor 110; the communication module 140 configured to communicate with the communication module 240 of the robot to realize a communication between the control device 100 and the robot 200; and the memory device 150 configured to store commands executed by the processor 110 and data related to the interaction with the robot 200. The robot 200 includes: the arm 201; the moving mechanism 202 configured to realize a movement of the robot 200; the image acquisition module 220; the loudspeaker 230; the communication module 240 configured to communicate with the communication module 140 of the control device 100, thereby realizing the communication between the robot 100 and the control device 200; and the memory device 250 configured to store commands executed by the processor 210 and data during an interaction with the control device 100. The mobile terminal 300 includes: the displayer 320 configured to display a frame related to a predetermined interaction scenario; the loudspeaker 330 configured to output an audio signal; the communication module 340 configured to communicate with the communication module 240 of the robot; and the memory device 350 configured to store commands executed by the processor 310.

Where, although the operation input by the user 400 is received by the control device 100 through the button 101 and the button 102 in the present embodiment, and the operation of the user can also be received by other types of input devices. For example, the operation of the user can be received through a touch screen, or the input from other devices (e.g. a keyboard and a mouse) can be wirelessly received.

The processor 110 in the control device 100 is configured to execute the following operation commands: sending the operation command input by the user to the robot 200. Then, the input operation command sent by the processor 110 of the control device 100 is sent to the mobile terminal 300 by the processor 210 in the robot 200.

Further, the processor 210 in the robot 200 is configured to execute the following operation commands: receiving the scenario information sent by the mobile terminal 300, wherein the scenario information is used to instruct an interaction scenario in which the robot 200 interacts with the user; and controlling the robot 200 to move to a designate position corresponding to the interaction scenario according to the scenario information; receiving the control command sent by the mobile terminal 300 and related to the interaction scenario, wherein the control command is used to instruct the robot 200 to perform an operation corresponding to the operation of the user in the interaction scenario; and controlling the robot 200 to perform an operation related to the control command in the interaction scenario.

Further, the processor 310 of the mobile terminal 300 is configured to execute the following operation commands: sending the scenario information to the robot 200, wherein the scenario information is used to instruct an interaction scenario in which the robot 200 interacts with the user; and determining the control command, wherein the control command is used to control the robot 200 to perform an operation corresponding to the operation input by the user in the interaction scenario; and sending the control command to the robot 200.

In this manner, the control device 100 only needs to send an operation command related to the operation of the user 400 to the robot 200, and the robot 200 sends the operation command of the user 400 to the mobile terminal 300, and the scenario information and the control command are sent to the robot 200 by the mobile terminal 300. Therefore, the system can fully utilize the computing resources and storage resources of the mobile terminal 300 of the user 400, so that the scenario information related to the interaction scenario in which the robot 200 interacts with the user 400 and the control command for interacting with the user 400 in the scenario are both issued by the mobile terminal 300 to realize a colorful interaction scenario between the user and the robot. Thereby, the hardware complexity and the computing power consumption of the control device 100 can be reduced, and the costs of the control device 100 and the robot 200 also can be reduced.

At the same time, since the main computing module is separated from other modules, the ability of handling complex problems of the entire robot operating system can be upgraded by replacing the mobile terminal 300 having greater computing ability in the future. Therefore, the control device 100 and the robot 200 do not need to be upgraded, which makes the system upgrade more flexible and less costly.

As described in the background, the development of artificial intelligence technology has popularized robots having certain intelligent functions. Consequently, the emergence of robots has also brought a lot of fun to people. However, there are still a number of limitations to the existing robots. For example, robots are set as a subordinate position in the prior art, thereby showing an interaction characteristic mainly obedient to the command from action to interaction. However, this basic setting limits the robots' active service to humans, and also deprives the possibility of an individualized development for the robots. Currently, the interaction between the robot and the user is still confined to a simple voice interaction, and the robots are not able to perform a complex communication. Therefore, the interaction scenario and the interactive content between the robot and the user are excessively monotonous and therefore the user will quickly lose interest in the robot. Therefore, people are eager to provide a robot capable of performing a complex interaction with the user in a more colorful scenario.

Therefore, in view of the foregoing technical problems in the prior art that the interaction scenario and the interactive content between the robot and the user are excessively monotonous, and therefore the user will quickly lose interest in the robot, as shown in FIG. 3 and FIG. 4, the third aspect of the present embodiment proposes the robot 200. The robot 200 includes the processor 210 configured to execute the following operation commands: controlling the robot 200 to move to a designated position corresponding to an interaction scenario, wherein the interaction scenario is a scenario in which the robot interacts with the user; and controlling the robot 200 to perform an operation corresponding to an operation of the user in the interaction scenario.

Specifically, the robot 200 is controlled by the processor 210 to move to a designated position corresponding to the interaction scenario, wherein the designated position may be around the control device 100 or any other positions. Then, the processor 210 controls the robot 200 to perform an operation corresponding to the operation of the user in the interaction scenario.

Therefore, in this manner, the user 400 can select an interaction scenario for interacting with the robot 200, and then after the interaction scenario is selected by the user 400, the processor 210 of the robot 200 controls the robot 200 to move to the designated position corresponding to the interaction scenario. Then, the processor 210 controls the robot 200 to perform an operation corresponding to the operation of the user in the interaction scenario. Thereby, an interaction scenario in which the user 400 interacts with the robot 200 can be selected, and then the robot 200 interacts with the user 400 in the interaction scenario according to the received scenario information related to the interaction scenario. The diversity of interaction scenarios between the user and the robot is realized, and the interactive content is more colorful. The interaction process between the robot and the user is closer to the human real world, thereby solving the technical problems that the interaction scenario and the interactive content between the robot and the user are excessively monotonous and therefore the user will quickly lose interest in the robot.

Optionally, the processor 210 is further configured to execute the following operation commands: receiving the scenario information, wherein the scenario information is used to instruct an interaction scenario in which the robot 200 interacts with the user; controlling the robot 200 to move to the designated position according to the scenario information; and receiving the control command related to the interaction scenario, wherein the control command is used to instruct the robot 200 to perform an operation corresponding to the operation of the user in the interaction scenario, and control the robot 200 to perform an operation related to the control command in the interaction scenario.

Specifically, the user 400 can select an interaction scenario before the robot 200 interacts with the user 400. For example, the interaction scenario may be: a single-person interaction scenario, i.e. only one user 400 interacts with the robot 200 in the scenario; a multi-person interaction scenario, i.e. a plurality of users interact with the robot 200 in the scenario. For example, but not limited to, in a case where the user 400 selects an interaction scenario in which the user 400 interacts with the robot 200 is a single-person interaction scenario, the scenario information related to the interaction scenario (i.e., the single-person interaction scenario) is received by the processor 210 of the robot 200.

Further, the processor 210 of the robot 200 controls the robot 200 to move to the designated position according to the scenario information. Then the control command related to the interaction scenario is received by the processor 210 of the robot 200, wherein the control command may be: a command for controlling the robot 200 and the user 400 to experience a predetermined game together. Then the robot 200 is controlled by the processor 210 of the robot 200 to perform an operation related to the control command in the interaction scenario. Namely, the robot 200 is controlled to experience the predetermined game together with the user 400. Therefore, in this way, the robot can interact with the user based on the interaction scenario selected by the user.

Optionally, the operation of receiving the scenario information, includes: receiving the scenario information sent by the mobile terminal 300; and the operation of receiving the control command related to the interaction scenario, includes: receiving the control command related to the interaction scenario sent by the mobile terminal 300.

Specifically, referring to FIG. 2 and FIG. 4, the control device 100 is configured to send an operation command input by the user 400 to the robot 200, and the mobile terminal 300 is configured to issue the scenario information and the control command. After the user 400 inputs an operation command related to the selected interaction scenario to the control device 100, the operation command is sent to the robot 200 by the control device 100, and the operation command is further sent to the mobile terminal 300 by the robot 200. Therefore, after the interaction scenario corresponding to the operation command input by the user is determined, the scenario information related to the interaction scenario is sent to the robot 200 by the mobile terminal 300. At this time, the scenario information sent by the mobile terminal 300 is received by the processor 210 of the robot 200. Then, after the robot 200 moves to the designated position, a control command related to the interaction scenario sent by the mobile terminal 300 is received. Then, the processor 210 can control the robot 200 to interact with the user 400 in the interaction scenario according to the received control command. Therefore, in this manner, the mobile terminal 300 determines a control command that the robot 200 interacts with the user 400 according to the operation of the user 400 in the interaction scenario and the scenario information, and sends the control command to the robot 200. Therefore, the scenario information and the control command are issued by the mobile terminal 300.

Optionally, the operation that the processor 210 receives the scenario information sent by the mobile terminal 300, includes: the processor 210 receiving a first operation command sent by the control device 100, wherein the first operation command is an operation command input by the user for controlling the mobile terminal 300 to determine the scenario information; the processor 210 sending the first operation command to the mobile terminal 300, and receiving the scenario information sent by the mobile terminal 300; and the operation that the processor 210 receives the control command related to the interaction scenario sent by the mobile terminal 300, includes: the processor 210 receiving a second operation command sent by the control device 100, wherein the second operation command is an operation command input by the user in the interaction scenario; the processor 210 sending the second operation command to the mobile terminal 300; and the processor 210 receiving the control command sent by the mobile terminal 300 and related to the second operation command.

Specifically, after the first operation command related to the selection of an interaction scenario is input to the control device 100 by the user 400, the first operation command is sent to the robot 200 by the control device 100. At this time, the processor 210 of the robot 200 receives the first operation command sent by the control device 100 and sends the first operation command to the mobile terminal 300. Then, the scenario information corresponding to the first operation command sent by the mobile terminal 300 is received by the processor 210. Further, in a case where the user 400 inputs the second operation command to the control device 100 based on the selected interaction scenario, and the second operation command is sent to the robot 200 by the control device 100, the received second operation command is sent to the mobile terminal 300 by the processor 210 of the robot 200. Then, in a case where the mobile terminal 300 determines a control command according to the received second operation command and sends the control command to the robot 200, the control command is received by the processor 210 of the robot 200. Therefore, in this manner, the operation command input by the user to the control device 100 can be sent to the mobile terminal 300 by the processor 210 of the robot 200, and then the processor 210 controls the robot 200 to perform a corresponding operation in the determined interaction scenario according to the related control command sent by the mobile terminal 300.

Optionally, the operation of receiving the scenario information, includes: receiving the first scenario information sent by the mobile terminal 300 and related to the first interaction scenario, wherein in the first interaction scenario, a user and the robot 200, respectively at a designated position relative to the control device 100, communicate with each other; and the operation of receiving the control command related to the interaction scenario, includes: receiving the first control command sent by the mobile terminal 300 and related to the first interaction scenario, wherein the first control command is used to control the robot 200 to communicate with the user at the designated position relative to the control device 100.

Specifically, the first scenario information sent by the mobile terminal 300 and related to the first interaction scenario is received by the processor 210, wherein in the first interaction scenario, the control device 100 can serve as a desktop to implement a scenario, and the user 400 and the robot 200 can communicate around the control device 100. Then the first interaction scenario information related to the first interaction scenario is sent to the robot 200 by the mobile terminal 300. At this time, the mobile terminal 300 displays the information and the frame related to the first interaction scenario, and then the user 400 can communicate with the robot 200 according to the content displayed by the mobile terminal 300.

Further, the first control command sent by the mobile terminal 300 is received by the processor 210 of the robot 200, wherein the first control command may be determined by the mobile terminal 300 according to the second operation command input by the user 400 in the first interaction scenario. For example, the control device 100 can be used as a desktop prop to serve as an article in the real world. Then the first control command can be used to control the robot 200 to perform together with the user 400 for an entertainment or an educational purpose. Therefore, in this manner, the user 400 can communicate with the robot 200 in the first interaction scenario. At the same time, the individualized development of the robot 200 is also promoted.

Optionally, the operation of receiving the scenario information, includes: receiving the second scenario information sent by the mobile terminal 300 and related to the second interaction scenario, wherein in the second interaction scenario, a user and the robot 200 experience the predetermined game together; and the operation of receiving the control command related to the interaction scenario, includes: receiving the second control command sent by the mobile terminal 300 and related to the second interaction scenario, wherein the second control command is used to control the robot 200 to experience the predetermined game together with the user.

Specifically, the second scenario information sent by the mobile terminal 300 and related to the second interaction scenario is received by the processor 210, wherein in the second interaction scenario, the control device 100 can serve as a game machine to implement a scenario, in the scenario, the user 400 and the robot 200 experience the predetermined game together. Then the second interaction scenario information related to the second interaction scenario is sent to the robot 200 by the mobile terminal 300. At this time, the mobile terminal 300 displays the information and the frame related to the second interaction scenario. Then, when the user 400 starts the game in the control device 100, the robot 200 can navigate to one side of the control device 100 for being opposite to the user 400, and place the hands on the button (e.g. the button 102) on the opposite side of the user 400, i.e. both hands of the user 400 are placed on the button 101, and both hands of the robot are placed on the button 102. In this way, when the user 400 is playing the game, the user will feel he/she is fighting against the robot 200.

Further, the second control command sent by the mobile terminal 300 is received by the processor 210, wherein the second control command is determined by the mobile terminal 300 according to the second operation command input by the user 400 in the second interaction scenario. For example, in the process of interaction, the second control command can control the robot 200 to perform corresponding operation actions according to the progress of the game.

In this manner, the robot 200 simply moves with the game and does not actually operate the role in the game. Alternatively, the second control command can also drive the robot 200 to actively press the buttons, thereby realizing a real scenario fighting against the user 400. Therefore, in this manner, the user 400 can interact with the robot 200 in a variety of ways in the second interaction scenario. At the same time, the individualized development of the robot is also promoted.

Optionally, the operation of receiving the scenario information, includes: receiving the third scenario information sent by the mobile terminal 300 and related to the third interaction scenario, wherein in the third interaction scenario, a plurality of users and the robot 200 experience the predetermined game together; and the operation of receiving the control command related to the interaction scenario, includes: receiving the third control command sent by the mobile terminal 300 and related to the third interaction scenario, wherein the third control command is used to control the robot 200 to experience the predetermined game together with the plurality of users.

Specifically, the third scenario information sent by the mobile terminal 300 and related to the third interaction scenario is received by the processor 210, wherein in the third interaction scenario, the control device 100 can serve as a game machine to implement a scenario, in the scenario, a plurality of users and the robot 200 experience the predetermined game together. Then the third interaction scenario information related to the third interaction scenario is sent to the robot 200 by the mobile terminal 300. At this time, the mobile terminal 300 displays the information and the frame related to the third interaction scenario.

Further, the third control command sent by the mobile terminal 300 is received by the processor 210, wherein the third control command is determined by the mobile terminal 300 according to the second operation command input by the user 400 in the third interaction scenario. For example, in the process of interaction, the third control command may control the robot 200 to play the game together with a plurality of users by using the control device 100. In the process of playing the game, the loser goes off and is replaced by another person. The third control command may also be used to control the robot 200 as an auxiliary role (a referee, a cheerleader, an instructor, etc.) to participate in a versus game with the plurality of users. Therefore, in this way, the interestingness of the interaction is greatly improved.

Optionally, the operation of receiving the scenario information, includes: receiving the fourth scenario information sent by the mobile terminal 300 and related to the fourth interaction scenario, wherein in the fourth interaction scenario, a plurality of users and the robot 200 are located at the designated positions for communication; and the operation of receiving the control command related to the interaction scenario, includes: receiving the fourth control command sent by the mobile terminal 300 and related to the fourth interaction scenario, wherein the fourth control command is used to control the robot 200 to communicate with the plurality of users at the designated position.

Specifically, the fourth scenario information sent by the mobile terminal 300 and related to the fourth interaction scenario is received by the processor 210, wherein in the fourth interaction scenario, the control device 100 can serve as a desktop to implement a scenario, in the scenario, a plurality of users and the robot 200 are located at the designated positions for communication. Then the fourth interaction scenario information related to the fourth interaction scenario is sent to the robot 200 by the mobile terminal 300. At this time, the mobile terminal 300 displays the information and the frame related to the fourth interaction scenario. Then, the fourth control command sent by the mobile terminal 300 is received by the processor 210, wherein the fourth control command is determined by the mobile terminal 300 according to the second operation command input by the user 400 in the fourth interaction scenario. For example, the fourth control command may control the robot 200 to serve as a compere or an assistant to communicate with the plurality of users. Therefore, in this way, the interestingness of the interaction is greatly improved.

Optionally, the operation of receiving the scenario information, includes: receiving the scenario information sent by the control device 100, wherein the scenario information is scenario information determined by the control device 100 according to the first operation command input by the user, wherein the first operation command is an operation command input by the user for controlling the control device 100 to determine the scenario information; and the operation of receiving the control command related to the interaction scenario, includes: receiving the control command sent by the control device 100 and related to the interaction scenario, wherein the control command is a command determined by the control device 100 according to the second operation command input by the user, wherein the second operation command is an operation command input by the user in the interaction scenario.

Specifically, referring to FIG. 1 and FIG. 3, the control device 100 is configured to send the scenario information and the control command to the robot 200. After the user 400 inputs the first operation command related to the selection of interaction scenario to the control device 100, the control device 100 determines an interaction scenario in which the user 400 interacts with the robot 200 according to the first operation command, and sends the scenario information related to the determined interaction scenario to the robot 200. At this time, the scenario information sent by the control device 100 is received by the processor 210 of the robot 200. Then, after the processor 210 controls the robot 200 to move to the designated position according to the received scenario information, the control command used to control the robot 200 is determined by the control device 100 according to the second operation command input by the user 400 in the interaction scenario, and the determined control command is sent to the robot 200. Then, the processor 210 can control the robot 200 to interact with the user 400 in the interaction scenario according to the received control command. Therefore, in this manner, the control command that the robot 200 interacts with the user 400 is determined by the control device 100 according to the operation of the user 400 in the interaction scenario and the scenario information, and then the control command is sent to the robot 200. Therefore, the scenario information and the control command are issued by the control device 100.

Optionally, the operation of receiving the scenario information, includes: receiving the first scenario information sent by the control device 100 and related to the first interaction scenario, wherein in the first interaction scenario, a user and the robot 200, respectively at a designated position relative to the control device 100, communicate with each other; and the operation of receiving the control command related to the interaction scenario, includes: receiving the first control command sent by the control device 100, wherein the first control command is used to control the robot 200 to communicate with the user at a designated position relative to the control device 100.

Specifically, the first scenario information sent by the control device 100 and related to the first interaction scenario is received by the processor 210, wherein in the first interaction scenario, the control device 100 can serve as a desktop to implement a scenario, and the user 400 and the robot 200 can communicate around the control device 100. Then the first interaction scenario information related to the first interaction scenario is sent to the robot 200 by the control device 100. At this time, the mobile terminal 300 displays the information and the frame related to the first interaction scenario, and then the user 400 can communicate with the robot 200 according to the content displayed by the control device 100.

Further, the first control command sent by the control device 100 is received by the processor 210, wherein the first control command is determined by the control device 100 according to the second operation command input by the user 400 in the first interaction scenario. For example, the control device 100 can be used as a desktop prop to serve as an article in the real world. Then the first control command can be used to control the robot 200 to perform together with the user 400 for an entertainment or an educational purpose. Therefore, in this manner, the user 400 can communicate with the robot 200 in the first interaction scenario. At the same time, the individualized development of the robot 200 is promoted.

Optionally, the operation of receiving the scenario information, includes: receiving the second scenario information sent by the control device 100 and related to the second interaction scenario, wherein in the second interaction scenario, a user and the robot 200 experience the predetermined game together; and the operation of receiving the control command related to the interaction scenario, includes: receiving the second control command sent by the control device 100, wherein the second control command is used to control the robot 200 to experience the predetermined game together with the user.

Specifically, the second scenario information sent by the control device 100 and related to the second interaction scenario is received by the processor 210, wherein in the second interaction scenario, the control device 100 can serve as a game machine to implement a scenario, in the scenario, the user 400 and the robot 200 experience a predetermined game together. Then the second interaction scenario information related to the second interaction scenario is sent to the robot 200 by the control device 100. At this time, the control device 100 displays the information and the frame related to the second interaction scenario. Then, when the user 400 starts the game in the control device 100, the robot 200 can navigate to one side of the control device 100 for being opposite to the user 400, and place the hands on the button (e.g. the button 102) on the opposite side of the user 400, i.e., both hands of the user 400 are placed on the button 101, and both hands of the robot are placed on the button 102. Therefore, the user will feel he/she is fighting against the robot 200 when the user 400 is playing the game.

Further, the second control command sent by the control device 100 is received by the processor 210, wherein the second control command is determined by the control device 100 according to the second operation command input by the user 400 in the second interaction scenario. For example, in the process of interaction, the second control command may be that the control device 100 controls the robot 200 to perform corresponding operation actions according to the progress of the game. In this manner, the robot 200 simply moves with the game and does not actually operate the role in the game. Alternatively, the second control command may also be that the control device 100 drives the robot 200 to actively press the button, thereby realizing a real scenario fighting against the user 400. Therefore, in this manner, the user 400 can interact with the robot 200 in a variety of ways in the second interaction scenario. At the same time, the individualized development of the robot is promoted.

Optionally, the operation of receiving the scenario information, includes: receiving the third scenario information sent by the control device 100 and related to the third interaction scenario, wherein in the third interaction scenario, a plurality of users and the robot 200 experience the predetermined game together; and the operation of receiving the control command related to the interaction scenario, includes: receiving the third control command sent by the control device 100, wherein the third control command is used to control the robot 200 to experience the predetermined game together with the plurality of users.

Specifically, the third scenario information sent by the control device 100 and related to the third interaction scenario is received by the processor 210, wherein in the third interaction scenario, the control device 100 can serve as a game machine to implement a scenario, in the scenario, a plurality of users and the robot 200 experience the predetermined game together. Then the third interaction scenario information related to the third interaction scenario is sent to the robot 200 by the control device 100. At this time, the control device 100 displays the information and the frame related to the third interaction scenario.

Further, the third control command sent by the control device 100 is received by the processor 210, wherein the third control command is determined by the control device 100 according to the second operation command input by the user 400 in the third interaction scenario. For example, in the process of the interaction, the third control command may control the robot 200 to play the game together with a plurality of users by using the control device 100. In the process of playing the game, the loser goes off and is replaced by another person. At the same time, the third control command may also be used to control the robot 200 to serve as an auxiliary role (a referee, a cheerleader, an instructor, etc.) to participate in the versus game against the plurality of users. Therefore, in this way, the interestingness of the interaction is greatly improved.

Optionally, the operation of receiving the scenario information, includes: receiving the fourth scenario information sent by the control device 100 and related to the fourth interaction scenario, wherein in the fourth interaction scenario, a plurality of users and the robot 200 are located at the designated positions for communication; and the operation of receiving the control command related to the interaction scenario, includes: receiving the fourth control command sent by the control device 100, wherein the fourth control command is used to control the robot 200 to communicate with the plurality of users at the designated position.

Specifically, the fourth scenario information sent by the control device 100 and related to the fourth interaction scenario is received by the processor 210, wherein in the fourth interaction scenario, the control device 100 can serve as a desktop to implement a scenario, in the scenario, a plurality of users and the robot 200 are located at the designated positions for communication. Then the fourth interaction scenario information related to the fourth interaction scenario is sent to the robot 200 by the control device 100. At this time, the control device 100 displays the information and the frame related to the fourth interaction scenario. Then, the fourth control command sent by the control device 100 is received by the processor 210, wherein the fourth control command is determined by the control device 100 according to the second operation command input by the user 400 in the fourth interaction scenario. For example, the fourth control command may control the robot 200 to serve as a compere or an assistant to alternately communicate with the plurality of users. Therefore, in this way, the interestingness of the interaction is greatly improved.

Optionally, according to the scenario information, the operation of controlling the robot 200 to move to the designated position corresponding to the interaction scenario, includes: acquiring a first image of an identifying pattern on the control device 100 by the image acquisition module 220 arranged in the robot 200; determining a relative position of the robot relative to the control device 100 according to the first image; and driving the robot 200 to move to the designated position according to the determined relative position and the designated position.

Figure 5:
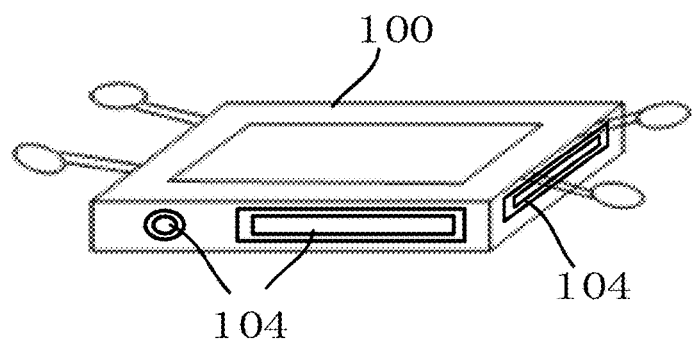
FIG. 5 is a schematic view showing an appearance of the control device 100 according to embodiment 1 of the present disclosure.

Specifically, FIG. 5 shows a schematic view of the appearance of the control device 100. As shown in FIG. 5, the identifying patterns 104 used for identification are arranged on side surfaces of the control device 100, and the identifying patterns 104 on the various side surfaces are different, so that the robot 200 can confirm which side of the control device 100 the robot 200 is located on. The first image of the identifying pattern 104 on the control device 100 is acquired by the processor 210 through the image acquisition module 220 arranged in the robot 200. Then, a relationship of the relative position between the robot 200 and the control device 100 is computed according to the acquired first image, and the relative position of the robot 200 relative to the control device 100 is determined, thereby navigating to an expected position. Then, the robot 200 is driven by the processor 210 to move to the designated position according to the determined relative position and the designated position.

Specifically, when the image acquisition module 220 of the robot 200 acquires the image of the identifying pattern 104 and if an angle of the robot 200 relative to the identifying pattern 104 is different, then the shape of the acquired image may be different. Moreover, the distance between the robot 200 and the identifying pattern 104 is different, the size of the acquired image will also be different. Therefore, the distance and the angle of the robot 200 relative to the control device 100 can be determined by the processor 210 of the robot 200 according to the shape and the size of the acquired identifying pattern 104, thereby the position of the robot 200 relative to the control device 100 is determined.

Further, the identifying pattern 104 on the long side of the control device 100 is relatively large, therefore, even if the robot 200 acquires the image of the identifying pattern at an oblique position, the offset position and the angle between the identifying patterns 104 can be computed, thereby navigating to a right position. In this way, the relative position of the robot 200 relative to the control device 100 is determined according to the first image of the identifying pattern 104 on the control device acquired by the processor, thereby driving the robot 200 to move to the designated position. In addition, the identifying patterns 104 on different side surfaces of the control device 100 can also be set differently, so that the processor 210 of the robot 200 can determine which side of the control device 100 the robot 200 is located on according to the acquired identifying pattern 104.

Optionally, according to the scenario information, the operation of controlling the robot 200 to move to the designated position corresponding to the interaction scenario, further includes: acquiring the second image of the control device 100 by the image acquisition module 220; extracting the first feature, the second feature and the third feature from the second image, wherein the first feature is the location information of the central position located on one side surface of the control device 100; the second feature and the third feature are respectively edges of two sides of the upper surface of the control device 100; in a case where the first feature is located at a middle position between the second feature and the third feature and the first feature is located at a middle position of the second image, it is determined that the robot 200 has reached the designated position.

Specifically, the second image of the control device 100 is acquired by the processor 210 of the robot 200 through the image acquisition module 220. Then the first feature, the second feature and the third feature are extracted from the second image by the processor 210, wherein the first feature is the location information of the central position located on one side surface of the control device 100, and the second feature and the third feature are respectively the edges of the two sides of the upper surface of the control device 100. Moreover, in a case where the first feature is located at a middle position between the second feature and the third feature, and the first feature is located at a middle position of the second image, the processor 210 determines that the robot 200 has reached the designated position. In this way, the second image of the control device 100 is acquired and the three edges of the second image is extracted, so as to determine whether the three edges of the second image are aligned, thereby allowing the robot 200 to accurately reach the designated position.

Therefore, according to the technical solution provided by the third aspect of the embodiments of the present disclosure, the user 400 can select an interaction scenario for interacting with the robot 200, and then the robot 200 moves to the designated position according to the received scenario information related to the determined interaction scenario. Moreover, in the interaction scenario, after the control command is received by the robot 200, the robot is controlled by the processor 210 of the robot 200 to perform an operation corresponding to the control command, thereby realizing a more colorful scenario in which the robot interacts with the user and making the interactive content between the robot and the user more colorful. The robot-human interaction process is closer to the real world, thereby solving the technical problems that the interaction scenario and the interactive content between the robot and the user are excessively monotonous and therefore the user will quickly lose interest in the robot.

In the fourth aspect of the present embodiment, the mobile terminal 300 is provided. The mobile terminal 300 includes the processor 310 configured to execute the following operation commands: sending the scenario information to the robot 200, wherein the scenario information is used to instruct an interaction scenario in which the robot 200 interacts with the user; determining the control command, wherein the control command is used to control the robot 200 to perform an operation corresponding to the operation input by the user in the interaction scenario; and sending the control command to the robot 200.

Specifically, after the operation command sent by the robot 200 and related to the determination of interaction scenario is received, an interaction scenario in which the robot 200 interacts with the user 400 is determined by the processor 310 of the mobile terminal 300 according to the operation command, and the scenario information related to the determined interaction scenario is sent to the robot 200 by the processor 310. Then, the operation command sent by the robot 200 and input by the user 400 in the interaction scenario is received by the processor 310 of the mobile terminal 300, and the control command used to control the interaction of the robot 200 with the user 400 is determined according to the operation command input by the user 400 in the interaction scenario. Then the determined control command is sent to the robot 200 by the processor 310 of the mobile terminal 300.

Therefore, in this way, the computing resources and storage resources of the mobile terminal 300 of the user 400 are fully utilized, thereby the hardware complexity and the computing power consumption of the control device 100 and the robot 200 can be reduced and thereby the cost is also reduced which translates into the prices of the control device 100 and the robot 200 being reduced. For example, the algorithm of face recognition or voice recognition of the robot 200 can be realized on the mobile terminal 300 such as a mobile phone. With the same volume and battery capacity, the robot 200 can achieve a longer activity time. At the same time, since the main computing module is separated from other modules, the ability of handling complex problems of the entire hardware system can be upgraded in the future by replacing the mobile terminal 300 having greater computing power. The non-computing modules (the control unit 100 and the robot 200) have no need to be upgraded, which makes the system upgrade more flexible and less costly. In some applicable scenarios, a novel interaction form can be created by increasing the number of the robots 200. There is no need to replace other modules at this time. The interaction scenario in which the user 400 interacts with the robot 200 can be selected by the user 400, and then the scenario information and the control command are sent to the robot 200 by the mobile terminal 300 according to the operation command of the user sent by the robot. The diversity of the interaction scenario between the user and the robot is realized, and the interactive content is more colorful. The interaction process between the robot and the user is closer to the human real world, thereby solving the technical problems that the interaction scenario and the interactive content between the robot and the user are excessively monotonous and therefore the user will quickly lose interest in the robot.

Optionally, the operation of sending the scenario information to the robot 200, includes: receiving the first operation command sent by the robot 200, wherein the first operation command is an operation command input by the user for controlling the mobile terminal 300 to determine the scenario information; and determining the scenario information according to the first operation command; and the operation of determining the control command, includes: receiving the second operation command sent by the robot 200, wherein the second operation command is an operation input by the user in the interaction scenario; and determining the control command according to the second operation command.

Specifically, the operation command sent by the robot 200 for controlling the mobile terminal 300 to determine the scenario information is received by the processor 310 of the mobile terminal 300. Then, the interaction scenario in which the robot 200 interacts with the user 400 is determined by the processor 310 of the mobile terminal 300 according to the operation command, and the scenario information related to the determined interaction scenario is sent to the robot 200. In addition, the operation command sent by the robot 200 and input by the user 400 in the interaction scenario is received by the processor 310 of the mobile terminal 300, and then the control command used to control the interaction of the robot 200 with the user 400 is determined according to the operation command input by the user 400 in the interaction scenario. In this way, the mobile terminal 300 can determine the interaction scenario and the control command according to the operation command input by the user 400 and provides the user 400 with a colorful interaction scenario and interactive content.

Optionally, the operation of determining the scenario information according to the first operation command, includes: determining the first interaction scenario in which the user interacts with the robot 200 according to the first operation command, wherein in the first interaction scenario, the user and the robot 200, respectively at a designated position relative to the control device 100, communicate with each other; the operation of determining the control command according to the second operation command, includes: determining the first control command according to the second operation command, wherein the first control command is used to control the robot 200 to communicate with the user at a designated position relative to the control device 100.

Specifically, after the first operation command sent by the robot 200 for controlling the mobile terminal 300 to determine the scenario information is received by the processor 310 of the mobile terminal 300, wherein the first operation command input by the user instructs that the user wants to communicate with the robot 200 around the control device 100, the processor 310 of the mobile terminal 300 determines the interaction scenario in which the robot 200 interacts with the user 400 as the first interaction scenario according to the first operation command, and the first scenario information related to the determined first interaction scenario is sent to robot 200.

Further, the second operation command sent by the robot 200 and input by the user 400 in the first interaction scenario is received by the processor 310 of the mobile terminal 300, and then the first control command used to control the interaction of the robot 200 with the user 400 is determined according to the operation command input by the user 400 in the first interaction scenario, wherein the first control command may control the robot 200 to perform together with the user 400 for an entertainment or an education purpose. In this way, the mobile terminal 300 can determine the interaction scenario and the first control command according to the operation command input by the user 400 and provides the user 400 with a colorful interaction scenario and interactive content.

Optionally, the operation of determining the scenario information according to the first operation command, includes: determining the second interaction scenario in which the user interacts with the robot 200 according to the first operation command, wherein in the second interaction scenario, the user and the robot 200 experience a predetermined game together; and the operation of determining the control command according to the second operation command, includes: determining the second control command according to the second operation command, wherein the second control command is used to control the robot 200 to experience the predetermined game together with the user.

Specifically, after the first operation command sent by the robot 200 for controlling the mobile terminal 300 to determine the scenario information is received by the processor 310 of the mobile terminal 300, wherein the first operation command input by the user 400 instructs that the user 400 wants to experience the predetermined game together with the robot 200, the processor 310 of the mobile terminal 300 determines the interaction scenario in which the robot 200 interacts with the user 400 as the second interaction scenario according to the first operation command, and sends the second scenario information related to the determined second interaction scenario to robot 200.

Further, the second operation command sent by the robot 200 and input by the user 400 in the second interaction scenario is received by the processor 310 of the mobile terminal 300, and then the second control command used to control the interaction of the robot 200 with the user 400 is determined according to the operation command input by the user 400 in the second interaction scenario, wherein the second control command may control the robot 200 to perform a corresponding operation action or drive the robot 200 to actively press the buttons according to the progress of the game. In this way, the mobile terminal 300 can determine the interaction scenario and the second control command according to the operation command input by the user 400 and provides the user 400 with a colorful interaction scenario and interactive content.

Optionally, the operation of determining the scenario information according to the first operation command, includes: determining the third interaction scenario in which the user interacts with the robot 200 according to the first operation command, wherein in the third interaction scenario, a plurality of users and the robot 200 experience the predetermined game together; and the operation of determining the control command according to the second operation command, includes: determining the third control command according to the second operation command, wherein the third control command is used to control the robot 200 to experience the predetermined game together with the plurality of users.

Specifically, after the first operation command sent by the robot 200 for controlling the mobile terminal 300 to determine the scenario information is received by the processor 310 of the mobile terminal 300, wherein the first operation command input by the user instructs that a plurality of users want to experience the predetermined game together with the robot 200, the processor 310 of the mobile terminal 300 determines the interaction scenario in which the robot 200 interacts with the user 400 as the third interaction scenario according to the first operation command, and sends the third scenario information related to the determined third interaction scenario to the robot 200.

Further, the second operation command sent by the robot 200 and input by the user 400 in the third interaction scenario is received by the processor 310 of the mobile terminal 300, and then the third control command used to control the robot 200 to interact with a plurality of users is determined according to the operation command input by the user 400 in the third interaction scenario, wherein in the process of interaction, the third control command may be used to control the robot 200 to play the game together with the plurality of users by using the control device 100. In the process of playing the game, the loser goes off and is replaced by another person. The third control command may also be used to control the robot 200 to serve as an auxiliary role (a referee, a cheerleader, an instructor, etc.) to participate in a versus game against with a plurality of users. Therefore, in this manner, the mobile terminal 300 can determine the interaction scenario and the third control command according to the operation command input by the user 400 and provides the user with a colorful interaction scenario and interactive content.

Optionally, the operation of determining the scenario information according to the first operation command, includes: determining the fourth interaction scenario in which the user interacts with the robot 200 according to the first operation command, wherein in the fourth interaction scenario, a plurality of users and the robot 200 are located at the designated positions for communication; the operation of determining the control command according to the second operation command, includes: determining the fourth control command according to the second operation command, wherein the fourth control command is used to control the robot 200 to communicate with the plurality of users at the designated position.

Specifically, after the first operation command sent by the robot 200 for controlling the mobile terminal 300 to determine the scenario information is received by the processor 310 of the mobile terminal 300, wherein the first operation command input by the user instructs that a plurality of users and the robot 200 are located at the designated positions for communication, the processor 310 of the mobile terminal 300 determines the interaction scenario in which the robot 200 interacts with the user 400 as the fourth interaction scenario according to the first operation command, and sends the fourth scenario information related to the determined fourth interaction scenario to the robot 200.

Further, the second operation command sent by the robot 200 and input by the user 400 in the fourth interaction scenario is received by the processor 310 of the mobile terminal 300, and then the fourth control command used to control the interaction of the robot 200 with the user 400 is determined according to the operation command input by the user 400 in the fourth interaction scenario, wherein the fourth control command may control the robot 200 to serve as a compere or an assistant to alternately communicate with a plurality of users. In this way, the mobile terminal 300 can determine the interaction scenario and the fourth control command according to the operation command input by the user 400 and provides the user with colorful interaction scenarios and interactive content.

In the fifth aspect of the present embodiment, the control device 100 is provided. The control device 100 includes the processor 110 configured to execute the following operation commands: sending the scenario information to the robot 200, wherein the scenario information is used to indicate an interaction scenario in which the robot interacts with the user; determining the control command, wherein the control command is used to control the robot 200 to perform an operation corresponding to the operation input by the user in the interaction scenario; and sending the control command to the robot 200.

Specifically, in a case where the user 400 inputs an operation command related to the selection of an interaction scenario to the control device 100, the processor 110 of the control device 100 determines the interaction scenario in which the user 400 interacts with the robot 200 according to the operation command related to the selection of an interaction scenario and input by the user 400, and sends the scenario information related to the determined interaction scenario to the robot 200. Then, after the user 400 inputs the operation of an interaction with the robot in the determined interaction scenario, the processor 110 of the control device 100 determines the control command used to control the interaction of the robot 200 with the user 400 according to the operation of the interaction with the robot 200 input by the user 400, and sends the determined control command to the robot 200.

Therefore, in this case, the control device 100 will assume the primary computing task. The display of the scenario, the control of the process of the entire scenario, and the computing of data related to the interaction can be realized only by the control device 100, thereby the interaction scenario can be realized only by using the control device 100. The control device 100 can determine the interaction scenario and the control command according to the operation command input by the user 400 and provides the user 400 with a colorful interaction scenario and interactive content.

Optionally, the operation of sending the scenario information to the robot 200, includes: determining the scenario information according to the first operation command, wherein the first operation command is an operation command input by the user for controlling the control device 100 to determine the scenario information; and the operation of determining the control command, includes: determining the control command according to the second operation command, wherein the second operation command is an operation command input by the user in the interaction scenario.

Specifically, the processor 110 of the control device 100 determines an interaction scenario in which the robot 200 interacts with the user 400 according to the first operation command input by the user and related to the determination of an interaction scenario, and sends the scenario information related to the determined interaction scenario to the robot 200. In addition, the control command used to control the robot 200 to interact with the user 400 is determined by the processor 110 of the control device 100 according to the second operation command input by the user 400 in the interaction scenario. In this way, the control device 100 can determine the interaction scenario and the control command according to the operation command input by the user 400 and provides the user 400 with a colorful interaction scenario and interactive content, thereby solving the technical problems that the interaction scenario and the interactive content between the robot and the user are excessively monotonous and therefore the user will quickly lose interest in the robot.

Optionally, the operation of determining the scenario information according to the first operation command, includes: the first interaction scenario in which the user interacts with the robot 200 is determined according to the first operation command, wherein in the first interaction scenario, the user and the robot 200, respectively at a designated position relative to the control device 100, communicate with each other; and the operation of determining the control command according to the second operation command, includes: determining the first control command according to the second operation command, wherein the first control command is used to control the robot 200 to communicate with the user at a designated position relative to the control device 100.

Specifically, after the first operation command input by the user and related to the determination of scenario information is received by the processor 110 of the control device 100, wherein the first operation command input by the user instructs that the user wants to communicate with the robot 200 around the control device 100, the processor 110 of the control device 100 determines the interaction scenario in which the robot 200 interacts with the user 400 as the first interaction scenario according to the first operation command, and sends the first scenario information related to the determined first interaction scenario to the robot 200.

Further, the first control command used to control the robot 200 to interact with the user 400 is determined by the processor 110 of the control device 100 according to the second operation command input by the user 400 in the first interaction scenario, wherein the first control command may control the robot 200 to perform together with the user 400 for an entertainment or an education purpose. In this way, the control device 100 can determine the interaction scenario and the first control command according to the operation command input by the user 400 and provides the user 400 with a colorful interaction scenario and interactive content.

Optionally, the operation of determining the scenario information according to the first operation command, includes: determining the second interaction scenario in which the user interacts with the robot 200 according to the first operation command, wherein in the second interaction scenario, the user and the robot 200 experience a predetermined game together; and the operation of determining the control command according to the second operation command, includes: determining the second control command according to the second operation command, wherein the second control command is used to control the robot 200 to experience the predetermined game together with the user.

Specifically, after the first operation command input by the user 400 and related to the determination of an scenario information is received by the processor 110 of the control device 100, wherein the first operation command input by the user 400 instructs that the user 400 wants to experience the predetermined game together with the robot 200, the processor 110 of the control device 100 determines the interaction scenario in which the robot 200 interacts with the user 400 as the second interaction scenario according to the first operation command, and sends the second scenario information related to the determined second interaction scenario to the robot 200.

Further, the second operation command sent by the robot 200 and input by the user 400 in the second interaction scenario is received by the processor 110 of the control device 100, and the second control command used to control the interaction of the robot 200 with the user 400 is determined according to the operation command input by the user 400 in the second interaction scenario, wherein the second control command may control the robot 200 to perform a corresponding operation action or drive the robot 200 to actively press the buttons according to the progress of the game. In this way, the control device 100 can determine the interaction scenario and the second control command according to the operation command input by the user 400 and provides the user 400 with a colorful interaction scenario and interactive content.

Optionally, the operation of determining the scenario information according to the first operation command, includes determining the third interaction scenario in which the user interacts with the robot 200 according to the first operation command, wherein in the third interaction scenario, a plurality of users and the robot 200 experience the predetermined game together; and the operation of determining the control command according to the second operation command, includes: determining the third control command according to the second operation command, wherein the third control command is used to control the robot 200 to experience the predetermined game together with the plurality of users.

Specifically, after the first operation command input by the user and related to the determination of an scenario information is received by the processor 110 of the control device 100, wherein the first operation command input by the user instructs that a plurality of users want to experience the predetermined game together with the robot 200, the processor 110 of the control device 100 determines the interaction scenario in which the robot 200 interacts with the user 400 as the third interaction scenario according to the first operation command, and sends the third scenario information related to the determined third interaction scenario to the robot 200.

Further, the third control command used to control the robot 200 to interact with the user 400 is determined by the processor 110 of the control device 100 according to the second operation command input by the user 400 in the third interaction scenario, wherein in the process of the interaction, the third control command may control the robot 200 to play the game together with a plurality of users by using the control device 100. In the process of playing the game, the loser goes off and is replaced by another person. The third control command may also be used to control the robot 200 to serve as an auxiliary role (a referee, a cheerleader, an instructor, etc.) to participate in a versus game against with the plurality of users. Therefore, in this manner, the control device 100 can determine the interaction scenario and the third control command according to the operation command input by the user 400 and provides the user 400 with a colorful interaction scenario and interactive content.

Optionally, the operation of determining the scenario information according to the first operation command, includes: determining the fourth interaction scenario in which the user interacts with the robot 200 according to the first operation command, wherein in the fourth interaction scenario, a plurality of users and the robot 200 are located at the designated positions for communication; and the operation of determining the control command according to the second operation command, includes: determining the fourth control command according to the second operation command, wherein the fourth control command is used to control the robot 200 to communicate with the plurality of users at the designated position.

Specifically, after the first operation command input by the user and related to the determination of an scenario information is received by the processor 110 of the control device 100, wherein the first operation command input by the user instructs that a plurality of users and the robot 200 are located at the designated positions for communication, the processor 110 of the control device 100 determines the interaction scenario in which the robot 200 interacts with the user 400 as the fourth interaction scenario according to the first operation command, and sends the fourth scenario information related to the determined fourth interaction scenario to the robot 200.

Further, the fourth control command used to control the robot 200 to interact with the user 400 is determined by the processor 110 of the control device 100 according to the received second operation command input by the user 400 in the fourth interaction scenario, wherein the fourth control command may control the robot 200 to serve as a compere or an assistant to alternately communicate with a plurality of users. In this way, the control device 100 can determine the interaction scenario and the fourth control command according to the operation command input by the user 400 and provides the user 400 with a colorful interaction scenario and interactive content.

Optionally, the processor 110 is further configured to control the displayer 120 of the control device 100 to display an interactive interface corresponding to the interaction scenario.

Specifically, in the system shown in FIG. 1 and FIG. 3, the interactive interface corresponding to the interaction scenario is displayed by the display screen 103 of the control device 100. Specifically, referring to FIG. 1 and FIG. 3, the control device 100 includes the button 101, the button 102, the displayer 120, and the loudspeaker 130. In this case, the control device 100 will assume the primary computing task. Therefore, the display of the scenario, the control of the process of the entire scenario, and the computing of the data related to the interaction can be realized only by the control device 100, thereby the interaction scenario can be realized by only using the control device 100.

Additionally, the robot 200 further includes a sensor mainly used to directly and actively acquire the information of various state variables in the operating environment and the state of the device. The devices that the sensor is mainly responsible for can be the image acquisition module 220 on the robot, the microphone (not shown), the accelerometer, the gyroscope, the magnetometer (not shown), the counter (not shown) on the robot wheel, etc.

It should be noted that, in order to make a brief description, the foregoing methods in the embodiments are all described as a combination of a series of actions. However, it should be understood by those skilled in the art that the present invention is not limited by the described sequence of actions, as some steps may be performed in other sequences or at the same time according to the present invention. In addition, those skilled in the art should also understand that the embodiments described in the specification are all preferred embodiments, and the involved actions and modules are not necessarily required by the present invention.

According to the description of the above embodiments, those skilled in the art can clearly understand that the methods according to the above embodiments can be realized by software, a necessary universal hardware platform, and by hardware. However, in many cases, the former is a preferred embodiment. Based on such understanding, an essence or a part contributed to the prior art of the technical solution of the present invention can be embodied in the form of a software product. The computer software product is stored in a storage medium (e.g. a read only memory/a random access memory, a magnetic disk, an optical disk), and includes a plurality of commands used to instruct a terminal device (may be a mobile phone, a computer, a server, or a network device, etc.) to perform the methods described in the embodiments of the present invention.

Embodiment 2

In the first aspect of the present embodiment, a method for controlling a robot to perform an operation includes: controlling the robot to move to a designated position corresponding to an interaction scenario, wherein the interaction scenario is a scenario in which the robot interacts with a user; and controlling the robot to perform an operation corresponding to an operation of the user in the interaction scenario.

Optionally, the method further includes: receiving scenario information, wherein the scenario information is used to instruct the interaction scenario in which the robot interacts with the user; controlling the robot to move to the designated position according to the scenario information; receiving a control command related to the interaction scenario, wherein the control command is used to instruct the robot to perform the operation corresponding to the operation of the user in the interaction scenario; and controlling the robot to perform an operation corresponding to the control command in the interaction scenario.

Optionally, the operation of receiving the scenario information includes: receiving the scenario information sent by the mobile terminal; and the operation of receiving the control command related to the interaction scenario includes: receiving the control command sent by the mobile terminal and related to the interaction scenario.

Optionally, the operation of receiving the scenario information sent by the mobile terminal includes: receiving the first operation command sent by the control device, wherein the first operation command is an operation command input by the user for controlling the mobile terminal to determine the scenario information; sending the first operation command to the mobile terminal; and receiving the scenario information sent by the mobile terminal; and the operation of receiving the control command sent by the mobile terminal and related to the interaction scenario includes: receiving the second operation command sent by the control device, wherein the second operation command is an operation command input by the user in the interaction scenario; sending the second operation command to the mobile terminal; and receiving the control command sent by the mobile terminal and related to the second operation command.

Optionally, the operation of receiving the scenario information includes: receiving the first scenario information sent by the mobile terminal and related to the first interaction scenario, wherein in the first interaction scenario, the user and the robot, respectively at a designated position relative to the control device, communicate with each other; and the operation of receiving the control command related to the interaction scenario includes: receiving the first control command sent by the mobile terminal and related to the first interaction scenario, wherein the first control command is used to control the robot to communicate with the user at the designated position relative to the control device.

Optionally, the operation of receiving the scenario information includes: receiving the second scenario information sent by the mobile terminal and related to the second interaction scenario, wherein in the second interaction scenario, a user and the robot experience the predetermined game together; and the operation of receiving the control command related to the interaction scenario includes: receiving the second control command sent by the mobile terminal and related to the second interaction scenario, wherein the second control command is used to control the robot to experience the predetermined game together with the user.

Optionally, the operation of receiving the scenario information includes: receiving the third scenario information sent by the mobile terminal and related to the third interaction scenario, wherein in the third interaction scenario, a plurality of users and the robot experience the predetermined game together; and the operation of receiving the control command related to the interaction scenario includes: receiving the third control command sent by the mobile terminal and related to the third interaction scenario, wherein the third control command is used to control the robot to experience the predetermined game together with the plurality of users.

Optionally, the operation of receiving the scenario information includes: receiving the fourth scenario information sent by the mobile terminal and related to the fourth interaction scenario, wherein in the fourth interaction scenario, a plurality of users and the robot are located at the designated positions for communication; and the operation of receiving the control command related to the interaction scenario includes: receiving the fourth control command sent by the mobile terminal and related to the fourth interaction scenario, wherein the fourth control command is used to control the robot to communicate with the plurality of users at the designated position.

Optionally, the operation of receiving the scenario information includes: receiving the scenario information sent by the control device, wherein the scenario information is scenario information determined by the control device according to the first operation command input by the user, wherein the first operation command is an operation command input by the user for controlling the control device to determine the scenario information; and the operation of receiving the control command related to the interaction scenario includes: receiving the control command sent by the control device and related to the interaction scenario, wherein the control command is a command determined by the control device according to the second operation command input by the user, wherein the second operation command is an operation command input by the user in the interaction scenario.

Optionally, the operation of receiving the scenario information includes: receiving the first scenario information sent by the control device and related to the first interaction scenario, wherein in the first interaction scenario, a user and the robot, respectively at a designated position relative to the control device, communicate with each other; and the operation of receiving the control command related to the interaction scenario includes: receiving the first control command sent by the control device, wherein the first control command is used to control the robot to communicate with the user at the designated position relative to the control device.

Optionally, the operation of receiving the scenario information includes: receiving the second scenario information sent by the control device and related to the second interaction scenario, wherein in the second interaction scenario, a user and the robot experience the predetermined game together; and the operation of receiving the control command related to the interaction scenario includes: receiving the second control command sent by the control device, wherein the second control command is used to control the robot to experience the predetermined game together with the user.

Optionally, the operation of receiving the scenario information includes: receiving the third scenario information sent by the control device and related to the third interaction scenario, wherein in the third interaction scenario, a plurality of users and the robot experience the predetermined game together; and the operation of receiving the control command related to the interaction scenario includes: receiving the third control command sent by the control device, wherein the third control command is used to control the robot to experience the predetermined game together with the plurality of users.

Optionally, the operation of receiving the scenario information includes: receiving the fourth scenario information sent by the control device and related to the fourth interaction scenario, wherein in the fourth interaction scenario, a plurality of users and the robot are located at the designated positions for communication; and the operation of receiving the control command related to the interaction scenario includes: receiving the fourth control command sent by the control device, wherein the fourth control command is used to control the robot to communicate with the plurality of users at the designated position.

Optionally, according to the scenario information, the operation of controlling the robot to move to the designated position corresponding to the interaction scenario, includes:

acquiring the first image of the identifying pattern on the control device by the image acquisition module arranged on the robot; determining a relative position of the robot relative to the control device according to the first image; and driving the robot to move to the designated position according to the determined relative position and the designated position.

Optionally, according to the scenario information, the operation of controlling the robot to move to the designated position corresponding to the interaction scenario, further includes: acquiring the second image of the control device by the image acquisition module; extracting the first feature, the second feature, and the third feature from the second image, wherein the first feature is the location information of the central position located on one side surface of the control device; and the second feature and the third feature are respectively edges of two sides of the upper surface of the control device; and in a case where the first feature is located at a middle position between the second feature and the third feature, and the first feature is located at a middle position of the second image, it is determined that the robot has reached the designated position.

The executive body of the method for controlling the robot to perform the operation provided by the first aspect of the present embodiment is the processor 210 of the robot 200 in the system according to the third aspect of the first embodiment. Therefore, the further description of the specific methods and steps about how the processor 210 of the robot 200 controls the robot 200 to perform operations can refer to the description about the processor 210 of the robot 200 in the system described above.

In the second aspect of the present embodiment, a method for controlling the robot is provided, including: sending the scenario information to the robot by the mobile terminal, wherein the scenario information is used to instruct the interaction scenario in which the robot interacts with the user; determining the control command by the mobile terminal, wherein the control command is used to control the robot to perform an operation corresponding to the operation input by the user in the interaction scenario; and sending the control command to the robot by the mobile terminal.

Optionally, the operation of sending the scenario information to the robot by the mobile terminal, includes: receiving the first operation command sent by the robot, wherein the first operation command is an operation command input by the user for controlling the mobile terminal to determine the scenario information; and determining the scenario information according to the first operation command; and the operation of determining the control command by the mobile terminal, includes: receiving the second operation command sent by the robot, wherein the second operation command is an operation input by the user in the interaction scenario; and determining the control command according to the second operation command.

Optionally, the operation of determining the scenario information by the mobile terminal according to the first operation command, includes: determining the first interaction scenario in which the user interacts with the robot according to the first operation command, wherein in the first interaction scenario, a user and the robot, respectively at a designated position relative to the control device, communicate with each other; and the operation of determining the control command by the mobile terminal according to the second operation command, includes: determining the first control command according to the second operation command, wherein the first control command is used to control the robot to communicate with the user at the designated position relative to the control device.

Optionally, the operation of determining the scenario information by the mobile terminal according to the first operation command, includes: determining the second interaction scenario in which the user interacts with the robot according to the first operation command, wherein in the second interaction scenario, a user and the robot experience the predetermined game together; and the operation of determining the control command by the mobile terminal according to the second operation command, includes: determining the second control command according to the second operation command, wherein the second control command is used to control the robot to experience the predetermined game together with the user.

Optionally, the operation of determining the scenario information by the mobile terminal according to the first operation command, includes: determining the third interaction scenario in which the user interacts with the robot according to the first operation command, wherein in the third interaction scenario, a plurality of users and the robot experience the predetermined game together; and the operation of determining the control command by the mobile terminal according to the second operation command, includes: determining the third control command according to the second operation command, wherein the third control command is used to control the robot to experience the predetermined game together with the plurality of users.

Optionally, the operation of determining the scenario information by the mobile terminal according to the first operation command, includes: determining the fourth interaction scenario in which the user interacts with the robot according to the first operation command, wherein in the fourth interaction scenario, a plurality of users and the robot are located at the designated positions for communication; and the operation of determining the control command by the mobile terminal according to the second operation command, includes: determining the fourth control command according to the second operation command, wherein the fourth control command is used to control the robot to communicate with the plurality of users at the designated position.

Therefore, the executive body of the method for controlling the robot provided by the second aspect of the present embodiment is the processor 310 of the mobile terminal 300 in the system according to the fourth aspect of the first embodiment. Therefore, the further description of the specific methods and steps about how the processor 310 of the mobile terminal 300 controls the robot 200 can refer to the description about the processor 310 of the mobile terminal 300 in the system described above.

The third aspect of the present embodiment provides a method for controlling the robot, the method includes: sending the scenario information to the robot by the control device, wherein the scenario information is used to instruct the interaction scenario in which the robot interacts with the user; determining the control command by the control device, wherein the control command is used to control the robot to perform an operation corresponding to the operation input by the user in the interaction scenario; and sending the control command to the robot by the control device.

Optionally, the operation of sending the scenario information to the robot by the control device, includes: determining the scenario information according to the first operation command, wherein the first operation command is an operation command input by the user for controlling the control device to determine the scenario information; and the operation of determining the control command by the control device, includes: determining the control command according to the second operation command, wherein the second operation command is an operation command input by the user in the interaction scenario.

Optionally, the operation of determining the scenario information by the control device according to the first operation command, includes: determining the first interaction scenario in which the user interacts with the robot according to the first operation command, wherein in the first interaction scenario, a user and the robot, respectively at a designated position relative to the control device, communicate with each other; and the operation of determining the control command by the control device according to the second operation command, includes: determining the first control command according to the second operation command, wherein the first control command is used to control the robot to communicate with the user at the designated position relative to the control device.

Optionally, the operation of determining the scenario information by the control device according to the first operation command, includes: determining the second interaction scenario in which the user interacts with the robot according to the first operation command, wherein in the second interaction scenario, a user and the robot experience the predetermined game together; and the operation of determining the control command by the control device according to the second operation command, includes: determining the second control command according to the second operation command, wherein the second control command is used to control the robot to experience the predetermined game together with the user.

Optionally, the operation of determining the scenario information by the control device according to the first operation command, includes: determining the third interaction scenario in which the user interacts with the robot according to the first operation command, wherein in the third interaction scenario, a plurality of users and the robot experience the predetermined game together; and the operation of determining the control command by the control device according to the second operation command, includes: determining the third control command according to the second operation command, wherein the third control command is used to control the robot to experience the predetermined game together with the plurality of users.

Optionally, the operation of determining the scenario information by the control device according to the first operation command, includes: determining the fourth interaction scenario in which the user interacts with the robot according to the first operation command, wherein in the fourth interaction scenario, a plurality of users and the robot are located at the designated positions for communication; and the operation of determining the control command by the control device according to the second operation command, includes: determining the fourth control command according to the second operation command, wherein the fourth control command is used to control the robot to communicate with the plurality of users at the designated position.

Optionally, the method further includes controlling the displayer of the control device to display an interactive interface corresponding to the interaction scenario.

Therefore, the executive body of the method for controlling the robot provided by the third aspect of the present embodiment is the processor 110 of the control device 100 in the system according to the fifth aspect of the first embodiment. Therefore, the further description of the specific methods and steps about how the processor 110 of the control device 100 controls the robot 200 can refer to the description about the processor 110 of the control device 100 in the system described above.

In addition, according to the fourth aspect of the present embodiment, the storage medium 150, 250 or 350 is provided. The storage medium includes a stored program, wherein any one of the methods described above is executed by the processor when the program is running.

The sequence numbers of the embodiments of the present invention are only used for an illustration, which are not intended to represent the advantages and disadvantages of the embodiments.

In the foregoing embodiments of the present invention, the various embodiments are described with different emphasis, and the parts of one embodiment that are not described in detail can refer to the related descriptions of other embodiments.

In the several embodiments provided by the present application, it should be understood that the disclosed technical contents may be implemented by other methods, wherein the embodiments of the device described above are only illustrative. For example, the division of the unit is only a division of the logical functions, and other division methods may exist in an actual implementation. For example, a plurality of units or components may be combined or integrated into another system, or some features may be omitted or not executed. In addition, the mutual coupling, direct coupling or communication connection shown or discussed may be an indirect coupling or a communication connection through some interfaces, units or modules, or may be in electrical or other forms.

The units described as separate components may or may not be physically separated, and the components presented as units may or may not be physical units, i.e., they can be located in one place or be distributed to a plurality of network units. Some or all of the units may be selected according to actual needs to realize the purpose of the solution of the present embodiment.

In addition, each functional unit of each embodiment of the present invention may be integrated into one processing unit, or each unit may exist physically and separately. Alternatively, two or more units may be integrated into one unit. The foregoing integrated unit can be implemented in the form of hardware or in the form of a software functional unit.

If the integrated unit is implemented in the form of the software functional unit and is sold or used as an independent product. The integrated unit can be stored in a computer readable storage medium. Based on such understanding, an essence or a part contributed to the prior art of the technical solution of the present invention can be embodied in the form of a software product. The computer software product is stored in a storage medium and includes a plurality of commands to instruct a computer device (may be a personal computer, a server or a network device, etc.) to perform all or parts of the steps of the methods described in the each embodiment of the present invention. The foregoing storage medium includes a U disk, a read-only memory, a random access memory, a mobile hard disk, a magnetic disk, or an optical disk and other mediums that can store program codes.

The foregoing description is only the preferred embodiments of the present invention, and it should be noted that those skilled in the art can also make several improvements and modifications without departing from the principles of the present invention, and these improvements and modifications should be considered as falling within the protective scope of the present invention.

What is claimed is:

1. A robot, wherein the robot comprises a processor, and the processor is configured to execute the following operation commands:
   receiving scenario information, wherein the scenario information is configured to instruct an interaction scenario for the robot interacting with a user;
   controlling the robot to move to a designated position corresponding to the interaction scenario according to the scenario information, wherein the interaction scenario is a scenario for the robot interacting with the user,
   receiving a control command related to the interaction scenario, wherein the control command is configured to instruct the robot to perform an operation corresponding to an operation of the user in the interaction scenario; and
   controlling the robot to perform the operation corresponding to the operation of the user in the interaction scenario, wherein,
   an operation of receiving the scenario information comprises:
   receiving a second scenario information sent by a mobile terminal and related to a second interaction scenario, and
   receiving a third scenario information sent by a mobile terminal and related to a third interaction scenario, wherein in the third interaction scenario, a plurality of users and the robot experience a predetermined game together, wherein the users will feel they are fighting against the robot; and
   an operation of receiving the control command related to the interaction scenario comprises:
   receiving a second control command sent by the mobile terminal and related to the second interaction scenario, wherein the second control command is configured to control the robot to experience the predetermined game together with the user by controlling the robot to push a button of a game controller of the predetermined game according to a progress of the predetermined game, and
   receiving a third control command sent by the mobile terminal and related to the third interaction scenario, wherein the third control command is configured to control the robot to experience the predetermined game together with the plurality of users.

2. The robot according to claim 1, wherein,
   an operation of receiving the scenario information comprises: receiving scenario information sent by the mobile terminal; and an operation of receiving the control command related to the interaction scenario comprises: receiving a control command sent by the mobile terminal and related to the interaction scenario.

3. The robot according to claim 2, wherein an operation of receiving the scenario information sent by the mobile terminal comprises:
   receiving a first operation command sent by a control device, wherein the first operation command is an operation command input by the user for controlling the mobile terminal to determine the scenario information sent by the mobile terminal;
   sending the first operation command to the mobile terminal; and
   receiving the scenario information sent by the mobile terminal; and an operation of receiving the control command sent by the mobile terminal and related to the interaction scenario comprises:
   receiving a second operation command sent by the control device, wherein the second operation command is an operation command input by the user in the interaction scenario;
   sending the second operation command to the mobile terminal; and
   receiving the control command sent by the mobile terminal and related to the second operation command.

4. The robot according to claim 3, wherein
   the operation of receiving the scenario information comprises: receiving a first scenario information sent by the mobile terminal and related to a first interaction scenario, wherein in the first interaction scenario, the user and the robot, respectively located at a designated position relative to the control device, communicate with each other; and
   the operation of receiving the control command related to the interaction scenario comprises: receiving a first control command sent by the mobile terminal and related to the first interaction scenario, wherein the first control command is configured to control the robot to communicate with the user at the designated position relative to the control device.

5. The robot according to claim 1, wherein,
   an operation of receiving the scenario information comprises: receiving a fourth scenario information sent by a mobile terminal and related to a fourth interaction scenario, wherein in the fourth interaction scenario, a plurality of users communicate with the robot at the designated position; and
   an operation of receiving the control command related to the interaction scenario comprises: receiving a fourth control command sent by the mobile terminal and related to the fourth interaction scenario, wherein the fourth control command is configured to control the robot to communicate with the plurality of users at the designated position.

6. A mobile terminal, wherein the mobile terminal comprises a processor, and the processor is configured to execute the following operation commands:
   receiving a first operation command sent by a robot, wherein the first operation command is an operation command input by a user for controlling the mobile terminal to determine scenario information;
   determining the scenario information according to the first operation command;
   sending the scenario information to the robot, wherein the scenario information is configured to instruct an interaction scenario for the robot interacting with the user;
   receiving a second operation command sent by the robot, wherein the second operation command is an operation input by the user in the interaction scenario;
   determining a control command according to the second operation command, wherein the control command is configured to control the robot to perform an operation corresponding to an operation input by the user in the interaction scenario; and
   sending the control command to the robot to control the robot, wherein,
   an operation of determining the scenario information according to the first operation command comprises:
   determining a second interaction scenario for the user interacting with the robot according to the first operation command, and determining a third interaction scenario for a user interacting with the robot according to the first operation command wherein in the third interaction scenario, a plurality of users and the robot experience a predetermined game together, wherein the users will feel they are fighting against the robot; and an operation of determining the control command according to the second operation command comprises:

determining a second control command according to the second operation command, wherein the second control command is configured to control the robot to experience the predetermined game together with the user by controlling the robot to push a button of a game controller of the predetermined game according to a progress of the predetermined game, and determining a third control command according to the second operation command, wherein the third control command is configured to control the robot to experience the predetermined game together with the plurality of users.

7. The mobile terminal according to claim 6, wherein, an operation of determining the scenario information according to the first operation command comprises: determining a first interaction scenario for the user interacting with the robot according to the first operation command, wherein in the first interaction scenario, the user and the robot, respectively located at a designated position relative to a control device, communicate with each other; and an operation of determining the control command according to the second operation command comprises: determining a first control command according to the second operation command, wherein the first control command is configured to control the robot to communicate with the user at the designated position relative to the control device.

8. The mobile terminal according to claim 6, wherein, an operation of determining the scenario information according to the first operation command comprises: determining a fourth interaction scenario for the user interacting with the robot according to the first operation command, wherein in the fourth interaction scenario, a plurality of users communicate with the robot at a designated position;

an operation of determining the control command according to the second operation command comprises: determining a fourth control command according to the second operation command, wherein the fourth control command is configured to control the robot to communicate with the plurality of users at the designated position.

9. A control device, wherein the control device comprises a processor, and the processor is configured to execute the following operation commands:

determining scenario information according to a first operation command, wherein the first operation command is an operation command input by the user for controlling the control device to determine the scenario information;

sending the scenario information to a robot, wherein the scenario information is configured to instruct an interaction scenario for the robot interacting with a user;

determining a control command according to a second operation command, wherein the control command is configured to control the robot to perform an operation corresponding to an operation input by the user in the interaction scenario and wherein the second operation command is an operation command input by the user in the interaction scenario; and sending the control command to the robot to control the robot, wherein an operation of determining the scenario information according to the first operation command comprises:

determining a second interaction scenario for the user interacting with the robot according to the first operation command, and determining a third interaction scenario for a user interacting with the robot according to the first operation command, wherein in the third interaction scenario, a plurality of users and the robot experience a predetermined game together, wherein the users will feel they are fighting against the robot; and an operation of determining the control command according to the second operation command comprises:

determining a second control command according to the second operation command, wherein the second control command is configured to control the robot to experience the predetermined game together with the user by controlling the robot to push a button of a game controller of the predetermined game according to a progress of the predetermined game, and determining a third control command according to the second operation command, wherein the third control command is configured to control the robot to experience the predetermined game together with the plurality of users.

10. The control device according to claim 9, wherein, an operation of determining the scenario information according to the first operation command comprises: determining a first interaction scenario for the user interacting with the robot according to the first operation command, wherein in the first interaction scenario, the user and the robot, respectively located at a designated position relative to the control device, communicate with each other;

an operation of determining the control command according to the second operation command comprises: determining a first control command according to the second operation command, wherein the first control command is configured to control the robot to communicate with the user at the designated position relative to the control device.

11. The control device according to claim 9, wherein, an operation of determining the scenario information according to the first operation command comprises: determining a fourth interaction scenario for the user interacting with the robot according to the first operation command, wherein in the fourth interaction scenario, a plurality of users communicate with and the robot at a designated position;

an operation of determining the control command according to the second operation command comprises: determining a fourth control command according to the second operation command, wherein the fourth control command is configured to control the robot to communicate with the plurality of users at the designated position.

12. The control device according to claim 9, wherein the processor is further configured to control a displayer of the control device to display an interactive interface corresponding to the second interaction scenario.

13. A robot operating system, comprising: a control device, a robot, and a mobile terminal, wherein the control device is configured to send an operation command of a plurality of users to the robot, and the mobile terminal is configured to control the robot, wherein,
   a processor is configured in the robot, and the processor of the robot is configured to execute the following operation commands:
   receiving scenario information sent by the mobile terminal, wherein the scenario information is configured to instruct an interaction scenario for the robot interacting with the plurality of users;
   according to the scenario information, controlling the robot to move to a designated position corresponding to the interaction scenario;
   receiving a control command sent by the mobile terminal and related to the interaction scenario, wherein the control command is configured to instruct the robot to perform an operation corresponding to an operation of the plurality of users in the interaction scenario; and
   controlling the robot to perform an operation related to the control command in the interaction scenario; and
   the mobile terminal comprises a processor, and the processor of the mobile terminal is configured to execute the following operation commands:
   sending the scenario information to the robot, wherein the scenario information is configured to instruct the interaction scenario for the robot interacting with the plurality of users;
   determining the control command, wherein the control command is configured to control the robot to perform the operation corresponding to the operation input by the plurality of users in the interaction scenario, wherein the control command is configured to control the robot to experience a predetermined game together with the plurality of users; and
   sending the control command to the robot by controlling the robot to push a button of a game controller of the predetermined game according to a progress of the predetermined game.

14. A robot operating system, comprising: a control device and a robot, wherein,
   the control device comprises a processor, and the processor of the control device is configured to receive a control operation of a plurality of users;
   a processor is configured in the robot, and the processor of the robot is configured to execute the following operation commands:
   controlling the robot to move to a designated position corresponding to an interaction scenario, wherein the interaction scenario is a scenario for the robot interacting with the plurality of users in which the robot experiences a predetermined game with the plurality of users, and the interaction scenario is determined according to the control operation of the plurality of users; and
   controlling the robot to perform an operation corresponding to an operation of the plurality of users in the interaction scenario by controlling the robot to push a button of a game controller of the predetermined game according to a progress of the predetermined game.

15. The robotic operating system according to claim 14, wherein,
   the processor of the control device is further configured to execute the following operation commands:
   determining scenario information of the interaction scenario in response to the control operation of the plurality of users, and sending the scenario information to the robot wherein the scenario information is configured to instruct the interaction scenario for the robot interacting with the plurality of users;
   determining a control command, wherein the control command is configured to control the robot to perform an operation corresponding to an operation input by the plurality of users in the interaction scenario;
   sending the control command to the robot; and
   the processor of the robot is further configured to execute the following operation commands:
   receiving the scenario information sent by the control device;
   according to the scenario information, controlling the robot to move to the designated position corresponding to the interaction scenario;
   receiving the control command sent by the control device; and
   controlling the robot to perform an operation related to the control command in the interaction scenario.

16. A method of controlling a robot to perform an operation, comprising:
   controlling the robot to move to a designated position corresponding to an interaction scenario, wherein the interaction scenario is a scenario for the robot interacting with a plurality of users in which the robot experiences a predetermined game with the plurality of users; and
   controlling the robot to perform the operation corresponding to an operation of the plurality of users in the interaction scenario, wherein the operation corresponding to the operation of the plurality of users in the interaction scenario comprises pushing a button of a game controller of the predetermined game according to a progress of the predetermined game.

17. A method of controlling a robot, comprising:
   sending scenario information to the robot by a mobile terminal, wherein the scenario information is configured to instruct an interaction scenario for the robot interacting with a plurality of users in which the robot experiences a predetermined game with the plurality of users;
   determining a control command by the mobile terminal, wherein the control command is configured to control the robot to perform an operation corresponding to an operation input by the plurality of users in the interaction scenario; and
   sending the control command to the robot by the mobile terminal to control the robot to push a button of a game controller of the predetermined game according to a progress of the predetermined game.

18. A method of controlling a robot, comprising:
   sending scenario information to the robot by a control device, wherein the scenario information is configured to instruct an interaction scenario for the robot interacting with a plurality of users in which the robot experiences a predetermined game with the plurality of users;
   determining a control command by the control device, wherein the control command is configured to control the robot to perform an operation corresponding to an operation input by the plurality of users in the interaction scenario; and
   sending the control command to the robot by the control device to control the robot to push a button of a game controller of the predetermined game according to a progress of the predetermined game.

19. A non-transitory storage medium, wherein the non-transitory storage medium comprises a stored program, wherein the method according to claim 16 is performed by a processor when the stored program is running.

20. A non-transitory storage medium, wherein the non-transitory storage medium comprises a stored program, wherein the method according to claim 17 is performed by a processor when the stored program is running.

21. A non-transitory storage medium, wherein the non-transitory storage medium comprises a stored program, wherein the method according to claim 18 is performed by a processor when the stored program is running.

* * * * *